United States Patent
Tai

(10) Patent No.: US 8,065,075 B2
(45) Date of Patent: Nov. 22, 2011

(54) POWER CONTROL SYSTEM AND METHOD FOR THE SAME

(75) Inventor: Tzu-Tun Tai, Taoyuan (TW)

(73) Assignee: Mitac International Corporation, Taoyuan (TW)

( * ) Notice: Subject to any disclaimer, the term of this patent is extended or adjusted under 35 U.S.C. 154(b) by 307 days.

(21) Appl. No.: 12/404,145

(22) Filed: Mar. 13, 2009

(65) Prior Publication Data

US 2009/0248303 A1    Oct. 1, 2009

(30) Foreign Application Priority Data

Mar. 25, 2008   (TW) .............................. 97110479 A

(51) Int. Cl.
     *G01C 21/00*      (2006.01)
(52) U.S. Cl. ....................................................... 701/200
(58) Field of Classification Search .................. 701/200, 701/213, 214, 215
See application file for complete search history.

(56) References Cited

U.S. PATENT DOCUMENTS 6,812,887 B2 * 11/2004 Syrjarinne et al. ........ 342/357.74
7,847,726 B2 * 12/2010 Jia et al. .................... 342/357.31

\* cited by examiner

*Primary Examiner* — Kim T Nguyen
(74) *Attorney, Agent, or Firm* — Knobbe, Martens, Olson & Bear, LLP

(57) ABSTRACT

A power control system and method receives and filters a valid GPS signal received by a navigation device and outputs a corresponding performance parameter for the GPS signal, and upon determining that a power management signal is a power-off management signal, determines whether the performance parameter exceeds a predetermined first threshold. Alternatively, if the power management signal is not a power-off management signal, the performance parameter is determined whether it is smaller than a predetermined second threshold value. A processing module is managed to send a GPS power control signal that controls power provided to a GPS module in the navigation device, thereby reducing power consumption of the navigation device.

17 Claims, 2 Drawing Sheets

POWER CONTROL SYSTEM AND METHOD FOR THE SAME

FIELD OF THE INVENTION

The present invention relates to a technique for assisting navigation devices, and more particularly, to a power control system and method applicable to navigation devices for reducing power consumption thereof.

BACKGROUND OF THE INVENTION

In order for electronic devices, such as a vehicle navigation system or personal digital assistant (PDA), to provide global positioning services, a navigation device with a global positioning system (GPS) has to be perform signal transmission (if any), reception and processing, which allows determination of the coordinates of the current location of such a device. GPS utilizes twenty-four artificial satellites circling in six different orbits above the earth to continuously transmit GPS signals. If the navigation device is able to receive GPS signals transmitted by at least three satellites, then its current longitude, latitude and elevation, can be determined and its velocity and traveling direction can be computed with respect to a prior reading.

Additionally, when using the above navigation device to receive GPS signals, reception is sensitive to the external environment (such as weather and the surrounding terrain and buildings). For example, if the weather is rainy with heavy clouds in the sky, the amount of free electrons in the clouds is large, which may interfere with the GPS signals, such that the GPS signal strength received by the navigation device is too low to perform a proper reading. Also, if the navigation device is used in a tunnel or underground passage, the navigation device may not be able to receive GPS signals from the satellites well. However, in such situations, the GPS module inside the navigation device would not stop operating even if no sufficient GPS signals are received, which wastes power.

In order to solve the above problem, one current approach is to provide a button for turning on/off the power of the navigation device, such that the operating power of the navigation device is controlled by a user upon determining the strength of the signals received by the navigation device. However, such a solution requires the user to check for the signal strength from time to time while possibly engaging in some other activities (e.g. driving a car), in order to know whether to turn off the operating power of the navigation device when the GPS signal strength is too low. This approach is not very convenient and even poses danger if the user is driving. Moreover, since the signal strength is manually checked, periods with low signal strength may be overlooked, such that wasteful power consumption is not completely avoided.

Therefore, there is a need for a power control system and method for the same that prolongs the operating time of the satellite navigation device by saving power and eliminating the need for manual operation.

SUMMARY OF THE INVENTION

In the light of forgoing drawbacks, an objective of the present invention is to provide a power control system and method applicable to navigation devices that reduces power consumption during periods of weak signal strength.

Another objective of the present invention is to provide a power control system and method that avoids inefficient and inconvenient manual detection of low signal strength and manual control of power.

Still another objective of the present invention is to provide a power control system and method that avoids the danger of a user being distracted while controlling the power of the navigation device.

In accordance with the above and other objectives, the present invention provides a power control system applicable to a navigation device having at least a signal receiving module for receiving global positioning system (GPS) signals, a signal amplifying module for receiving and amplifying the GPS signals to output a valid GPS signal, a GPS module for receiving the valid GPS signal and performing position-calculating process, and a GPS power management module for outputting a power management signal that controls operating power to the GPS module. The power control system comprises: a signal filtering module electrically connected to the signal amplifying module for receiving the valid GPS signal output from the signal amplifying module and performing a filtering process on the valid GPS signal to obtain and output a corresponding performance parameter for a radio frequency (RF) signal; a storage module for storing thresholds and ranges; and a processing module electrically connected to the signal filtering module and the GPS power management module for receiving the RF signal performance parameter output by the signal filtering module and the power management signal output by the GPS power management module, and determining whether the current power management signal is a power-off management signal; if it is the power-off management signal, the GPS power management module further determines whether the RF signal performance parameter exceeds a predetermined first threshold value stored in the storage module; if it does, the GPS power management module is managed to send a GPS power-on management signal to the GPS power management module, which generates a corresponding power-on management signal, allowing operating power to be provided to the GPS module; on the other hand, if the power management signal is not a power-off management signal, the GPS power management module determines whether the RF signal performance parameter is smaller than a predetermined second threshold value also stored in the storage module; if it is smaller than the predetermined second threshold value, then the GPS power management is managed to send a GPS power-off management signal to the GPS power management module, which generates a corresponding power-off management signal which allows cutting off the operating power of the GPS module.

In the power control system of the present invention, the predetermined first threshold value is larger than the predetermined second threshold value. The predetermined first threshold value and the predetermined second threshold value are carrier-to-noise ratios (C/N) of the RF signal. In addition, if the processing module determines that the RF signal performance parameter is larger than the predetermined second threshold value, then, based on the RF signal performance parameter output by the signal filtering module, the processing module further identifies a performance parameter range to which the RF signal performance parameter belongs among a plurality of performance parameter ranges stored in the storage module. Afterward, it finds a power-on frequency signal parameter corresponding to the identified performance parameter range from the plurality of power-on frequency parameters stored in the storage module. Lastly, the processing module sends the determined power-on frequency parameter to the GPS power management module for generating a power management signal based on the received power-on frequency parameter. As a result, the GPS power management module allows providing operating power to the GPS module accordingly.

In accordance with the above and other objectives, the present invention further provides a power control method applicable to a navigation device having at least a signal receiving module for receiving a global positioning system (GPS) signal, a signal amplifying module for receiving and amplifying the GPS signal to output a valid GPS signal, a GPS module for receiving the valid GPS signal and performing a position-calculating process, and a GPS power management module for outputting a power management signal that allows operating power to be provided to the GPS module, which the power control method comprises: (1) receiving the valid GPS signal output from the signal amplifying module and performing a filtering process on the valid GPS signal to obtain and output a corresponding performance parameter for a radio frequency (RF); (2) receiving the power management signal output by the GPS power management module, and determining whether the current power management signal is a power-off management signal; if it is, the step goes to step (3), and, if it is not, the step jumps to step (5); (3) determining whether the RF signal performance parameter exceeds the predetermined first threshold value; if it does, then the step proceeds to step (4), and, if it does not, then the step returns to step (1); (4) sending a GPS power-on management signal to the GPS power management module, which generates a corresponding power-on management signal, allowing operating power to be provided to the GPS module, and then returning to step (1); (5) determining whether the RF signal performance parameter is smaller than a predetermined second threshold value; if it is smaller than the predetermined second threshold value, the step goes to step (6); and (6) sending a GPS power-off management signal to the GPS power management module, which generates a corresponding power-off management signal which allows cutting off the operating power of the GPS module.

In addition, the power control method of the present invention further includes pre-storing in the storage module the predetermined first threshold value, the predetermined second threshold value, a plurality of radio frequency performance parameter ranges and a plurality of power-on frequency parameters each corresponding to a performance parameter range and inversely changing with each the performance parameter ranges represented in value by the performance parameters included therein.

Moreover, step (5) of the above power control method of the present invention further includes, when determining that the RF signal performance parameter is larger than the predetermined second threshold value, then, based on the RF signal performance parameter output by the signal filtering module, identifying a performance parameter range to which the RF signal performance parameter belongs from a plurality of performance parameter ranges stored in the storage module, and then finding a power-on frequency signal parameter corresponding to the identified performance parameter range from a plurality of power-on frequency parameters stored in the storage module, and sending the determined power-on frequency parameter to the GPS power management module for generating a power management signal based on the received power-on frequency parameter, thereby allowing operating power to be provided to the GPS module accordingly.

Compared to the prior art, the power control system and method of the present invention receives and filters a valid GPS signal from the signal amplifying module of the navigation device to output a performance parameter corresponding to the GPS signal, and, upon determining that the power management signal output by the GPS power management module is a power-off management signal, determine whether the RF signal performance parameter exceeds a first threshold, wherein, if it does, then send a GPS power-on signal to the GPS power management module of the navigation device for generating a corresponding power-on management signal that allows power to be provided to the GPS module. But, if it is determined that the power management signal is not a power-off management signal, then determine whether the performance parameter is smaller than the second threshold, wherein, if it is smaller, then send a GPS power-off signal to the GPS power management module of the navigation device to generate a corresponding power-off management signal that cuts off the power provided to the GPS module.

In addition, when the performance parameter exceeds the predetermined second threshold value, then the present invention may further select a performance parameter range to which the RF signal performance parameter belongs from a plurality of pre-stored performance parameter ranges, and select a power-on frequency parameter corresponding to the selected performance parameter range. Thus, the operating power provided to the GPS module can be controlled by the power-on frequency parameter. In this way, the power consumption of the navigation device can be efficiently controlled, such that no unnecessary consumption of power occurs, so that the available operating time of the navigation device is increased.

Moreover, the power control system and method receives and analyses valid GPS signals sent from the signal amplifying module of the navigation device, enabling automatic power control of the GPS module, eliminating inefficient and inconvenient manual checking of the signal strength and controlling of power on/off, as well as avoiding danger due to distraction of the user.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the art can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
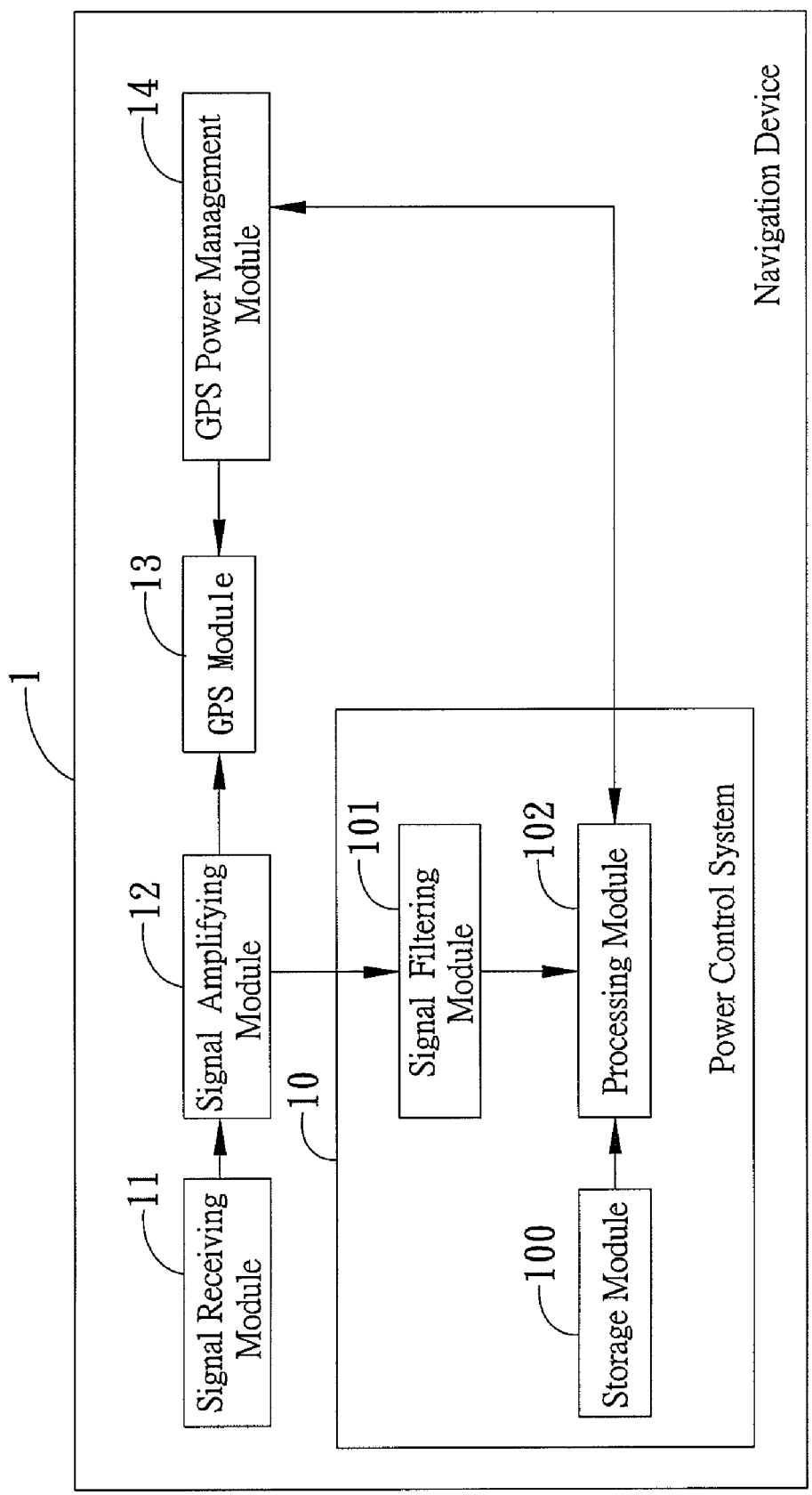
FIG. 1 is a schematic diagram depicting the basic structure of a power control system applicable in a navigation device according to an embodiment of the present invention.

FIG. 1 shows a block diagram of the basic structure of a power control system applicable in a navigation device according to an embodiment of the present invention. As shown, the power control system 10 of the present invention is applicable to a navigation device 1 for efficiently controlling the power status of the navigation device 1. In one embodiment, the navigation device 1 includes a signal receiving module 11, a signal amplifying module 12 such as an amplifier, a global positioning system (GPS) module 13 and a GPS power management module 14. The signal receiving module 11 receives GPS signals from navigation satellites, and then outputs the GPS signals. The signal amplifying module 12 amplifies the GPS signals received from the signal receiving module 11, so as to output valid GPS signals. The GPS module 13 receives the valid GPS signals output by the signal amplifying module 12 and then performs position-calculating processes. The GPS power management module 14 outputs a power management signal that enables operating power to be provided to the GPS module 13. The power management signal may be a power-off management signal, a power-on management signal, and a plurality of different power-on frequency management signals. It should be noted that the power control system 10 of the present invention can also be applied to navigation devices on vehicles (e.g. cars, ships, and aircraft) or in portable electronic devices, such as personal digital assistants (PDAs), mobile phones or portable computers.

As shown in FIG. 1, the power control system 10 of the present invention includes: a storage module 100, a signal filtering module 101 and a processing module 102. Detailed descriptions for the various components in the power control system 10 are given below.

The storage module 100 is used for pre-storing a first threshold value, a second threshold value smaller than the first threshold value, a plurality of radio frequency (RF) signal performance parameter ranges, and a plurality of power-on frequency parameters each corresponding to a performance parameter range. Further, the plurality of power-on frequency parameters inversely changes with the corresponding performance parameter ranges which is individually represented in value by the included RF signal performance parameters.

The first and second thresholds and the performance parameters are carrier-to-noise ratios (C/N) of radio signals. The C/N ratio indicates the strength of an RF signal, wherein the higher the C/N ratio, the stronger the RF signal. And the stronger the RF signal, the smaller the power-on frequency needs to be since less operating power is required. That is, the GPS module only needs to be cyclically powered on for a certain period based on the adopted power-on frequency. For example, five different RF signal performance parameter ranges and five power-on frequency parameters each corresponding to a performance parameter range may be pre-stored in the storage module 100. For illustration, five RF signal performance parameter ranges are individually classified into five grades, from the first to the fifth grade. The higher the grade of the range is, the higher the performance parameters in value are (i.e. C/N) included in that range, and the stronger is the RF signal. Therefore, the power-on frequencies are pre-stored in an inversely change manner corresponding to the performance parameter ranges in value.

In addition, the first threshold indicates the threshold C/N of a GPS signal going from no signal strength to one that is just high enough for the GPS module 13 to perform position acquisition (applied to the power control system 1 of the present invention, at this time, the power management signal is a power-off management signal, which will be described in more details later). Conversely, the second threshold indicates the threshold C/N of a GPS signal going from enough strength for the GPS module 13 to perform position acquisition to one that renders position acquisition of the GPS module 13 impossible (applied to the power control system 1 of the present invention, at this time, the power management signal is not a power-off management signal, which will be described in more details later). Since the signal strength of a GPS signal required from null to sufficient for position acquisition is larger than a GPS signal strength going from enough to not enough, thus, in this present embodiment, the first threshold is larger than the second threshold.

The signal filtering module 101 is connected to the signal amplifying module 12 for receiving a valid GPS signal therefrom and performs signal filtering processes to obtain and output a corresponding performance parameter for the RF signal. The signal filtering module 101 is, for example, an RF power detector. It should be noted that the GPS signal includes at least a baseband signal for signal processing and a radio frequency signal for signal reception processing. The signal filtering module 101 is mainly used for filtering out an RF signal performance parameter that indicates the signal reception status, allowing the processing module 102 to know the strength of the GPS signal and determine whether it is sufficient for the GPS module 13 to perform the position acquisition task.

The processing module 102 is electrically connected to the storage module 100, the signal filtering module 101 and the GPS power management module 14 for receiving the RF signal performance parameter output by the signal filtering module 101 and the power management signal output by the GPS power management module 14. The processing module 102 is used to determine whether the current power management signal is a power-off management signal, and, if it is, then it further determines whether the RF signal performance parameter exceeds the first threshold value, wherein, if it does, then a GPS power-on signal is sent to the GPS power management module 14, which generates a corresponding power-on signal, allowing operating power to be provided to the GPS module 13. However, if the power management signal is not a power-off management signal (i.e. it is a power-on management signal or one of various power-on frequency management signals), then the processing module 102 determines whether the RF signal performance parameter is smaller than the second threshold value, and, if it is, then a GPS power-off signal is sent to the GPS power management module 14, which generates a corresponding power-off management signal to cut off the operating power of the GPS module 13.

Otherwise, if the RF signal performance parameter is larger than the second threshold value, then, based on the RF signal performance parameter output by the signal filtering module 101, the processing module 102 identifies a performance parameter range to which the RF signal performance parameter belongs from a plurality of performance parameter ranges stored in the storage module 100. Then, the processing module 102 finds a power-on frequency signal parameter corresponding to the identified performance parameter range from a plurality of power-on frequency parameters stored in the storage module 100. Thereafter, the processing module 102 sends the determined power-on frequency parameter to the GPS power management module 14 for generating a power management signal based on the received power-on frequency parameter, thereby allowing operating power to be provided to the GPS module 13, accordingly.

Figure 2:
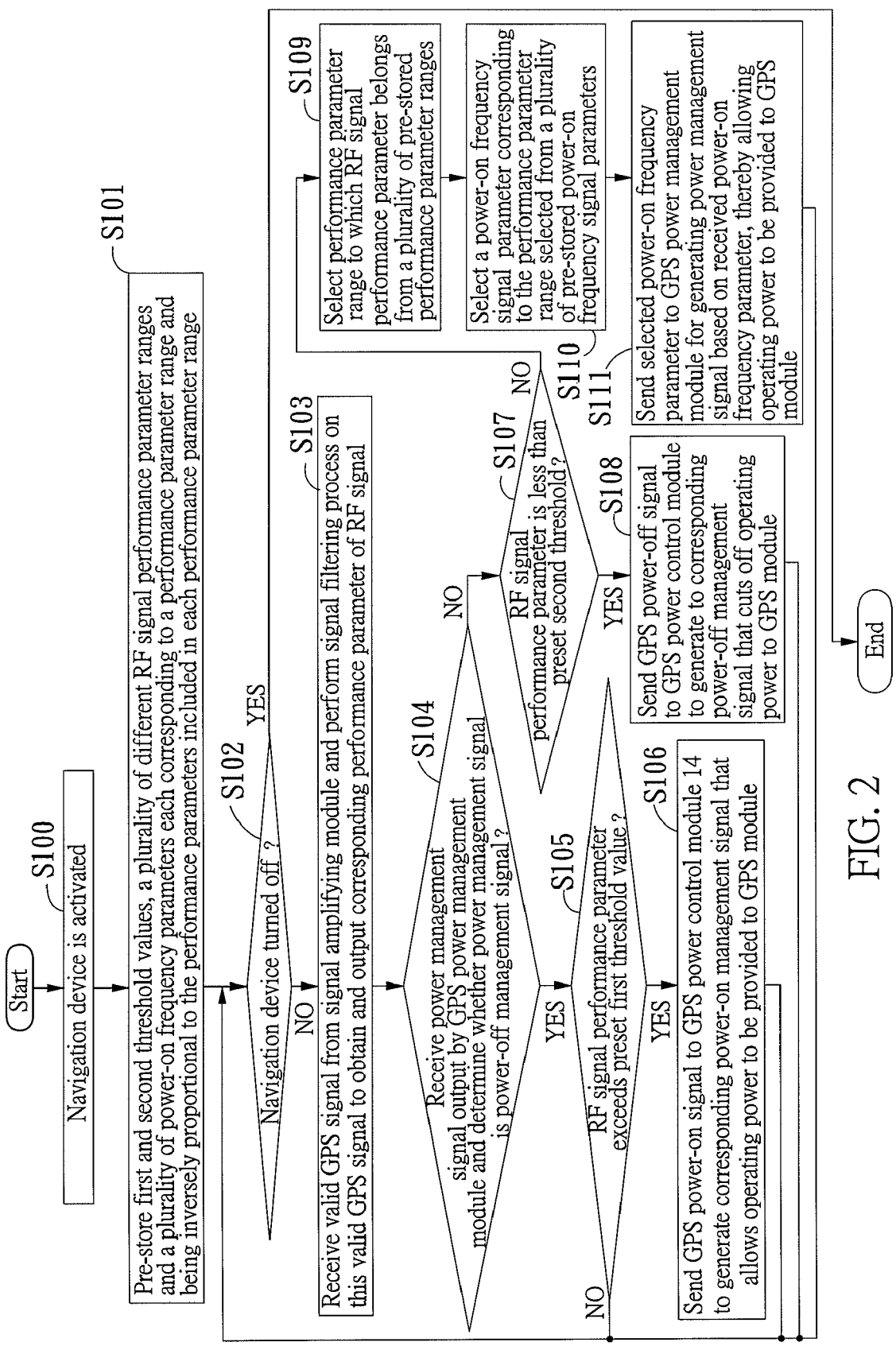
FIG. 2 is a flowchart illustrating a series of steps of a power controlling method according to an embodiment of the present invention.

FIG. 2 depicts the series of steps performed for a power controlling method using the power control system 10 above. Taken in conjunction with FIG. 1, the power controlling method of the present invention is applied to the navigation device 1 to efficiently control the power consumption of the navigation device 1. The navigation device 1 includes a signal receiving module 11, a signal amplifying module 12 such as an amplifier, a global positioning system (GPS) module 13 and a GPS power management module 14. The signal receiving module 11 is used to receive GPS signals sent by GPS satellites and output the GPS signals. The signal amplifying module 12 is used for receiving and amplifying the GPS signals output from the signal receiving module 11, so as to output valid GPS signals. The GPS module 13 is used for receiving the valid GPS signals to perform position-acquisition processes. The GPS power management module 14 is used for outputting a power management signal that enables operating power to be provided to the GPS module 13. The power management signal includes a power-off management signal, a power-on management signal and a plurality of different power-on frequency management signals. The processes of the power control method according to one embodiment of the present invention will be described below in conjunction with FIG. 1.

As shown in FIG. 2, in step S100, the navigation device 1 is activated, and then it proceeds to step S101.

In step S101, a first threshold, a second threshold smaller than the first threshold, a plurality of different RF signal performance parameter ranges and a plurality of power-on frequency parameters each corresponding to a performance parameter range and being inversely proportional to the performance parameters included in each performance parameter range are pre-stored. The first and second thresholds and the performance parameters are carrier-to-noise ratios (C/N) of radio signals. The first threshold indicates the threshold C/N of a GPS signal going from no signal strength to one that is just high enough for the GPS module 13 to perform position-acquisition (applied to the power control system 1 of the present invention, wherein, at this time, the power management signal is a power-off management signal, which will be described in more detail later). Conversely, the second threshold indicates the threshold C/N of a GPS signal going from enough strength for the GPS module 13 to perform position-acquisition to one that renders position-acquisition of the GPS module 13 impossible (applied to the power control system 1 of the present invention, at this time, the power management signal is not a power-off management signal, which will be described in more detail later). Since the signal strength of a GPS signal required from null to sufficient for position-acquisition is larger than the GPS signal strength going from enough to not enough, thus, in this present embodiment, the first threshold is larger than the second threshold. Then, continue to step S102.

In step S102, it is determined whether the navigation device is turned off. If it is off, the power control process is finished; otherwise, the step goes to step S103.

In step S103, a valid GPS signal is received from the signal amplifying module 12 and a signal filtering process is performed on this valid GPS signal to obtain and output a corresponding performance parameter for the RF signal. Then, proceed to step S104.

In step S104, a power management signal output by the GPS power management module 14 is received, and it is determined whether the power management signal is a power-off management signal, wherein if it is, the step goes to step S105; otherwise, the step goes to step S107.

In step S105, it is determined whether the RF signal performance parameter exceeds the first threshold value, wherein, if so, then the step proceeds to step S106; otherwise, return to step S102.

In step S106, a GPS power-on signal is sent to the GPS power control module 14 to generate a corresponding power-on management signal, which allows operating power to be provided to the GPS module 13. Then, return to step S102.

In step S107, it is determined whether the RF signal performance parameter is smaller than the second threshold, wherein, if it is smaller, then the step goes to step S108; otherwise, the step goes to step S109.

In step S108, a GPS power-off signal is sent to the GPS power control module 14 to generate a corresponding power-off management signal, which cuts off the operating power to the GPS module 13. Then, return to step S102.

In step S109, a performance parameter range to which the RF signal performance parameter belongs is selected from a plurality of pre-stored performance parameter ranges. Then, go to step S110.

In step S110, a power-on frequency signal parameter corresponding to the performance parameter range selected in step S110 is selected from a plurality of pre-stored power-on frequency signal parameters. Then, continue to step S111.

In step S111, the selected power-on frequency parameter is sent to the GPS power management module 14 for generating a power management signal based on the received power-on frequency parameter, thereby allowing operating power to be provided to the GPS module 13. Then, return to step S102.

According to the above, the power control system and method of the present invention receives and filters a valid GPS signal from the signal amplifying module of the navigation device to output a performance parameter for the GPS signal. Then, if the power management signal output by the GPS power management module is a power-off management signal, determine whether the RF signal performance parameter exceeds a first threshold, and, if it does, a GPS power-on signal is sent to the GPS power management module of the navigation device for generating a corresponding power-on management signal that allows power to be provided to the GPS module. However, if it is determined that the power management signal is not a power-off management signal, the GPS power management module determines whether the performance parameter is smaller than the second threshold. If it is, a GPS power-off signal is sent to the GPS power management module of the navigation device for generating a corresponding power-off management signal that allows cutting off the power provided to the GPS module.

In addition, when the performance parameter exceeds the predetermined second threshold value, then the present invention may further select a performance parameter range to which the RF signal performance parameter belongs among a plurality of pre-stored performance parameter ranges, and then select a power-on frequency parameter corresponding to the selected performance parameter range. Thus, the operating power provided to the GPS module can be controlled by the power-on frequency parameter. In this way, the power consumption of the navigation device can be efficiently controlled, such that no unnecessary usage of power occurs, so that the available operating time of the navigation device is increased.

Moreover, the power control system and method receives and analyzes valid GPS signals sent from the signal amplifying module of the navigation device, enabling automatic power control of the GPS module, eliminating inefficient and inconvenient manual checking of the signal strength and controlling of power on/off, as well as avoiding danger due to distraction of the user.

The above embodiments are only provided to illustrate the principles of the present invention, and should not be construed as to limit the present invention in any way. The above embodiments can be modified by those with ordinary skills in the art without departing from the scope of the present invention as defined in the following appended claims.

What is claimed is:

1. A power control system applicable to a navigation device having at least a signal receiving module for receiving a global positioning system (GPS) signal, a signal amplifying module for receiving and amplifying the GPS signal to output a valid GPS signal, a GPS module for receiving the valid GPS signal and performing position-acquisition processes, and a GPS power management module for outputting a power management signal that allows operating power to be provided to the GPS module, the power control system comprising:
   a signal filtering module electrically connected to the signal amplifying module for receiving the valid GPS signal output from the signal amplifying module and performing a signal filtering process on the valid GPS signal to correspondingly obtain and output a radio frequency (RF) signal performance parameter; and
   a processing module electrically connected to the signal filtering module and the GPS power management module for receiving the RF signal performance parameter output by the signal filtering module and the power management signal output by the GPS power management module, and determining whether the power management signal is a power-off management signal, wherein, if the power management signal is the power-off management signal, the processing module is to further determine whether the RF signal performance parameter exceeds a predetermined first threshold value, such that, if affirmative, the processing module is managed to send a GPS power-on management signal to the GPS power management module, so as for the GPS power management module to generate a corresponding power-on management signal for allowing operating power to be provided to the GPS module; alternatively, if the power management signal is not a power-off management signal, the processing module is managed to further determine whether the RF signal performance parameter is smaller than a predetermined second threshold value, such that, if affirmative, the processing module is to send a GPS power-off management signal to the GPS power management module, so as for the GPS power management module to generate a corresponding power-off management signal for allowing the operating power of the GPS module to be cut off.

2. The power control system of claim 1, wherein the predetermined first threshold value is larger than the predetermined second threshold value.

3. The power control system of claim 1, wherein the predetermined first threshold value and the predetermined second threshold value are carrier-to-noise ratios (C/N) of RF signals.

4. The power control system of claim 1, further comprising a storage module connected to the processing module for storing the predetermined first and second threshold values.

5. The power control system of claim 4, wherein the storage module further includes a plurality of ranges of RF signal performance parameters and a plurality of power-on frequency parameters in which each of the plurality of power-on frequency parameters corresponds to one of the plurality of ranges of the RF signal performance parameters and inversely changes with the one of the plurality of ranges of the RF signal performance parameters which is represented in value by the RF signal performance parameters included.

6. The power control system of claim 5, wherein the processing module further includes, when the RF signal performance parameter is determined not smaller than the predetermined second threshold value, finding the one of the plurality of ranges of the RF signal performance parameters to which the RF signal performance parameter belongs among the plurality of ranges of the RF signal performance parameters stored in the storage module based on the RF signal performance parameter output by the signal filtering module, and then finding a power-on frequency signal parameter corresponding to the one of the plurality of ranges of the RF signal performance parameters among the plurality of power-on frequency parameters stored in the storage module, and sending the power-on frequency parameter to the GPS power management module for generating the power management signal based on the power-on frequency parameter, thereby allowing operating power to be provided to the GPS module accordingly.

7. The power control system of claim 1, wherein the power management signal includes the power-off management signal, the power-on management signal and a plurality of power-on frequency management signals.

8. The power control system of claim 1, wherein the RF signal performance parameter is a C/N ratio of an RF signal.

9. The power control system of claim 1, wherein the signal filtering module is an RF power detector.

10. The power control system of claim 1, wherein the signal amplifying module is an amplifier.

11. A power control method applicable to a navigation device having at least a signal receiving module for receiving a global positioning system (GPS) signal, a signal amplifying module for receiving and amplifying the GPS signal to output a valid GPS signal, a GPS module for receiving the valid GPS signal and performing position-acquisition processes, and a GPS power management module for outputting a power management signal that allows operating power to be provided to the GPS module, the power control method comprising the steps of:
   (1) receiving the valid GPS signal output from the signal amplifying module and performing a filtering process using a filter on the valid GPS signal to correspondingly obtain and output an radio frequency (RF) signal performance parameter;
   (2) receiving the power management signal output by the GPS power management module, and determining by a processor whether the power management signal is a power-off management signal, wherein, if affirmative, the step goes to step (3); otherwise, the step goes to step (5);
   (3) determining by the processor whether the RF signal performance parameter exceeds a predetermined first threshold value, wherein, if affirmative, the step goes to step (4);
   otherwise, the step returns to step (1);
   (4) sending a GPS power-on signal to the GPS power management module, which correspondingly generates a power-on management signal allowing operating power to be provided to the GPS module;
   (5) determining by the processor whether the RF signal performance parameter is smaller than a predetermined second threshold value, wherein, if affirmative, then the step goes to step (6); and
   (6) sending the navigation device to send a GPS power-off signal to the GPS power management module, which correspondingly generates a power-off management signal allowing the operating power of the GPS module to be cut off.

12. The power control method of claim 11, wherein the predetermined first threshold value is larger than the predetermined second threshold value.

13. The power control method of claim 11, wherein the predetermined first threshold value and the predetermined second threshold value are carrier-to-noise ratios (C/N) of RF signals.

14. The power control method of claim 11, further comprising prior to step (1) pre-storing in a storage module the predetermined first threshold value, the predetermined second threshold value, a plurality of ranges of RF signal performance parameters and a plurality of power-on frequency parameters in which each of the plurality of power-on frequency parameters corresponds to one of the plurality of ranges of the RF signal performance parameters and inversely changes with the one of the plurality of ranges of the RF signal performance parameters which is represented in value by the RF signal performance parameters included.

15. The power control method of claim 14, further comprising in step (5), when the RF signal performance parameter is determined not smaller than the predetermined second threshold value, finding the one of the plurality of ranges of the RF signal performance parameters to which the RF signal performance parameter belongs among the plurality of ranges of the RF signal performance parameters pre-stored in the storage module based on the RF signal performance parameter output by the signal filtering module, and then finding a power-on frequency signal parameter corresponding to the one of the plurality of ranges of the RF signal performance parameters among the plurality of power-on frequency parameters pre-stored in the storage module, and sending the power-on frequency parameter to the GPS power management module for generating the power management signal based on the power-on frequency parameter, thereby allowing operating power to be provided to the GPS module accordingly.

16. The power control method of claim 11, wherein the power management signal includes the power-off management signal, the power-on management signal and a plurality of power-on frequency management signals.

17. The power control method of claim 11, wherein the RF signal performance parameter is a C/N ratio of an RF signal.

* * * * *